US009922116B2

(12) United States Patent
Rayes et al.

(10) Patent No.: US 9,922,116 B2
(45) Date of Patent: Mar. 20, 2018

(54) MANAGING BIG DATA FOR SERVICES

(71) Applicant: Cisco Technology, Inc., San Jose, CA (US)

(72) Inventors: Mark Ammar Rayes, San Ramon, CA (US); Hector Guillermo Trevino, Parker, CO (US); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 629 days.

(21) Appl. No.: 14/529,467

(22) Filed: Oct. 31, 2014

(65) Prior Publication Data
US 2016/0124957 A1 May 5, 2016

(51) Int. Cl.
*G06F 17/30* (2006.01)

(52) U.S. Cl.
CPC .. *G06F 17/30663* (2013.01); *G06F 17/30705* (2013.01); *G06F 17/30864* (2013.01)

(58) Field of Classification Search
CPC ......... G06F 17/30663; G06F 17/30705; G06F 17/30864
USPC ....................................................... 707/748
See application file for complete search history.

(56) References Cited

U.S. PATENT DOCUMENTS

| 5,918,010 | A | 6/1999 | Appleman et al. |
| 6,324,533 | B1 | 11/2001 | Agrawal et al. |
| 6,502,065 | B2* | 12/2002 | Imanaka ............. G06F 17/2715 348/468 |
| 7,409,393 | B2* | 8/2008 | Gregoire .......... G06F 17/30867 |
| 7,801,836 | B2 | 9/2010 | Sureka |
| 7,930,197 | B2 | 4/2011 | Ozzie et al. |
| 8,838,599 | B2* | 9/2014 | Xu .................... G06F 17/30616 707/737 |
| 2002/0083031 | A1* | 6/2002 | De Varax .......... G06F 17/30616 |
| 2004/0133560 | A1* | 7/2004 | Simske ............... G06F 17/3071 |
| 2005/0137723 | A1* | 6/2005 | Liu .......................... G09B 7/00 700/45 |
| 2006/0161524 | A1* | 7/2006 | Roy ................... G06F 17/30675 |
| 2008/0086466 | A1* | 4/2008 | Baker ............... G06F 17/30864 |
| 2008/0183700 | A1* | 7/2008 | Gabriel .............. G06Q 30/0263 |
| 2009/0049042 | A1* | 2/2009 | An ........................ G06Q 30/02 |
| 2009/0222436 | A1* | 9/2009 | Nastacio ........... G06F 17/30675 |
| 2010/0138428 | A1* | 6/2010 | Uchino ............. G06F 17/30864 707/751 |
| 2011/0231382 | A1* | 9/2011 | Xu ........................ G06F 17/278 707/706 |
| 2013/0024407 | A1* | 1/2013 | Thompson ........ G06F 17/30707 706/12 |
| 2013/0268551 | A1* | 10/2013 | Nikankin .......... G06F 17/30731 707/769 |
| 2014/0283048 | A1* | 9/2014 | Howes ............. G06F 17/30864 726/23 |

(Continued)

Primary Examiner — Kris Mackes
Assistant Examiner — Tiffany Bui
(74) Attorney, Agent, or Firm — Edell, Shapiro & Finnan, LLC

(57) ABSTRACT

Techniques are presented herein to monitor a plurality of big data sources in order to dynamically identify keywords. The big data sources are analyzed to classify the keywords as related to either a technical problem or to a solution to the technical problem. In addition, data associated with the keywords is weighted based on one or more attributes of the data and stored in a database in a problem-solution format.

21 Claims, 10 Drawing Sheets

(56) References Cited

U.S. PATENT DOCUMENTS

| | | | |
|---|---|---|---|
| 2015/0222329 A1* | 8/2015 | Ohren | G06Q 30/016 455/41.1 |
| 2015/0234835 A1* | 8/2015 | Joseph | G06F 17/30867 707/749 |
| 2016/0062980 A1* | 3/2016 | Boguraev | G06N 5/04 706/11 |

* cited by examiner

| PROBLEM | DYN? | WEIGHT | PRODUCT | DYN? | WEIGHT | SOFTWARE | DYN? | WEIGHT | ••• |
|---|---|---|---|---|---|---|---|---|---|
| REBOOT | N | 15 | NX9k | Y | 14 | 12.4(15)SW3 | N | 5 | |
| MEMORY ERROR | Y | 12 | NX7k | Y | 13 | 12.4(15)SW2 | Y | 4 | |
| UNREACHABLE | Y | 7 | 76xx | Y | 2 | 12.4(15)SY | Y | 7 | |
| RELOAD | N | 5 | | | | | | | |

FIG.11

MANAGING BIG DATA FOR SERVICES

TECHNICAL FIELD

The present disclosure relates to collecting and structuring data collected from multiple data sources.

BACKGROUND

"Big data" is a term used to describe the exponential growth and availability of both structured and unstructured data. Today, big data is generated by an increasing number of entities, including devices, digital processes, etc. Big data is defined by several attributes, including increasing volume, velocity, and variety, that make it difficult for enterprises/organizations to process using traditional database and software techniques. In most cases, the volume, velocity, or variety of big data exceeds the capabilities/capacities of an organization.

The "volume" of available data is increasing due to, for example, storing of transactional data, unstructured data streaming, increasing numbers of sensors/machine enabled with data collection abilities, etc. The "velocity" or speed at which data is streamed requires the processing of the data with ever increasing speeds. Additionally, the "variety" or type of data is increasing due to the large number of different available data formats (e.g., text documents, emails, videos, audio, etc.), numeric data, etc.

BRIEF DESCRIPTION OF THE DRAWINGS

FIG. 11 is a diagram illustrating records of keywords in a database according to an example embodiment.

DESCRIPTION OF EXAMPLE EMBODIMENTS

Overview

Techniques are presented herein to monitor a plurality of big data sources in order to dynamically identify keywords. The big data sources are analyzed to classify the keywords as related to either a technical problem or to a solution to the technical problem. Data associated with the keywords is weighted based on one or more attributes of the data and stored in a database in a problem-solution format for analysis.

Example Embodiments

So-called "smart" or "intelligent" services relate to real-time situational awareness and automated analysis of data to identify issues/problems and solutions to those problems. Conventional services systems lack the ability to leverage sources of "big data," referred to herein as big data sources. Presented herein are big data management techniques that provide the ability to collect and structure data from big data sources to account for the volume, velocity, and variety of the big data. After structuring the collected data into a common/unified database, services may utilize the structured big data to reactively, proactively, or preemptively generate solutions (e.g., warnings, recommendations, etc.) for identified technical issues/problems. Such solutions may be populated to users/devices, to service and sales personnel of a service provider, to service personnel of a manufacturer of the network and/or computer devices, etc. As a result, a mean time to repair (MTTR) may be reduced and customer satisfaction may be increased.

More specifically, as described further below, the big data management techniques identify and match keywords or phrases for the selection of data of interest. Once data of interest is identified, it is processed and put into a well-defined structure governed by an information model. This facilitates data correlation and analysis otherwise. The big data management techniques also facilitate the automatic learning of the categorization and taxonomy of features, products, etc. Based on this categorization, the distribution for a given model may be quantified. Additionally, the big data management techniques use metadata, tags, and numerical reputation of data in order to improve efficiency. This may be achieved by leveraging high-reputation content and data, and cross-map that to a customer name or other data attributes, etc.

Figure 1:
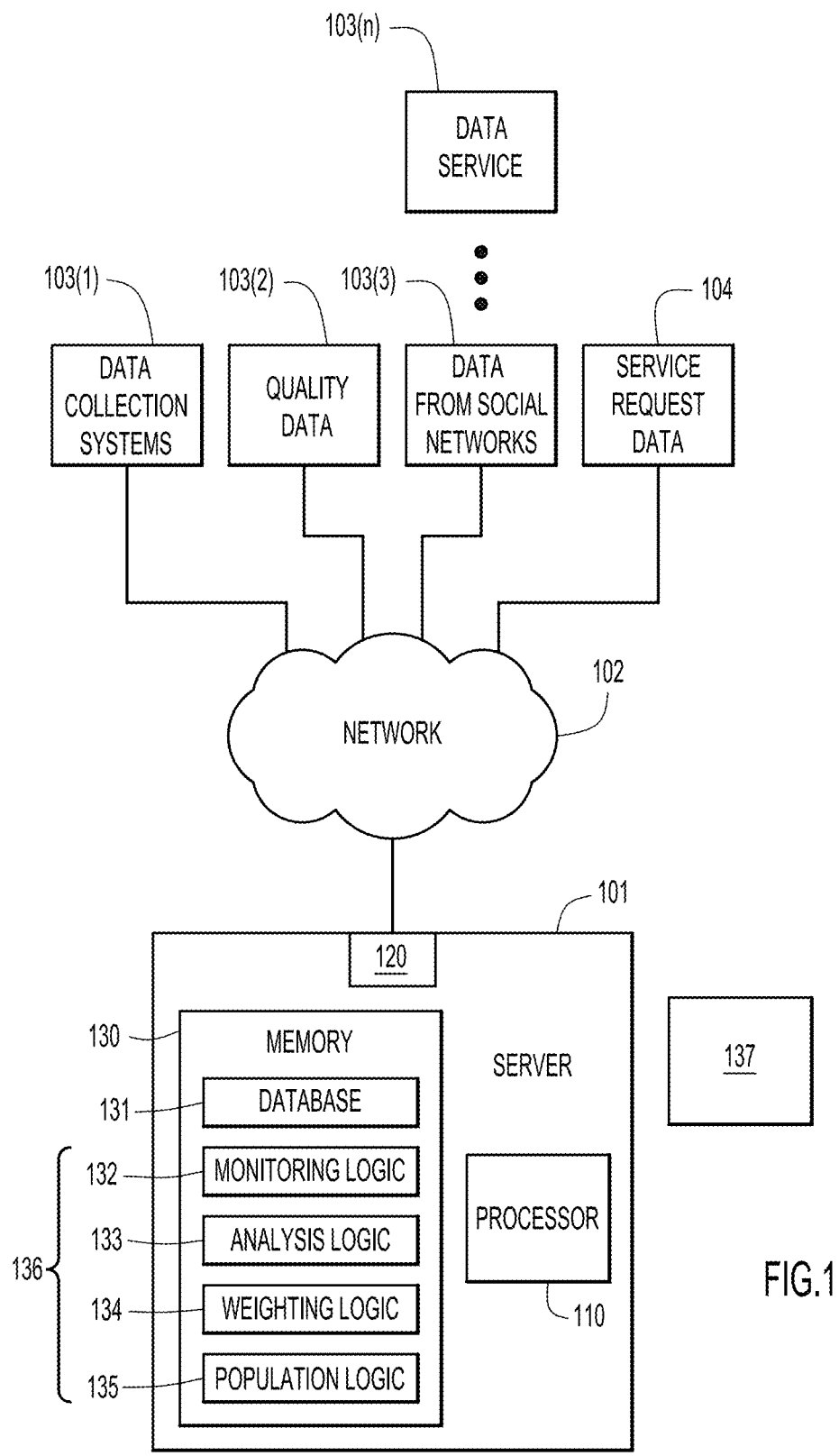
FIG. 1 is a block diagram illustrating a big data management system according to an example embodiment.

FIG. 1 is a block diagram illustrating a big data management system 100 configured to execute the big data management techniques presented herein. The big data management system 100 includes a server 101 and a plurality of big data sources 103(1)-103(N) each connected to a network 102. The network 102 may be, for example, a collection of one or more local area networks (LANs), wide area networks (WANs), wireless WANs, wireless LANs etc., and any combination thereof.

In the specific example of FIG. 1, big data sources 103(1)-103(N) include a data collection system 103(1), one or sources 103(2) of quality data (i.e., quality data sources), and one or more sources 103(3) of data from social networks (i.e., a social network data sources). It would be appreciated that the big data sources shown in FIG. 1 are merely illustrative and that other data sources may be present in other examples. Possible further big data sources may include, for example, diagnostic data sources, services support sites, agents, security services modules (CSC), expert forums, technical support mobile applications (TS Mobile Apps), technical assistance centers (TACs), bug databases, etc.

FIG. 1 illustrates a server 101 that, as described further below, is configured to execute big data management techniques presented herein to monitor data generated by the big data sources 103(1)-103(N) and structure the data into a unified database that may be analyzed in a manner that more readily leverages the big data. Merely for ease of illustration, the big data management techniques presented herein are described with reference to the single server 101. It is to be appreciated that, in practice, due to the attributes of big data, a plurality of servers or other devices may be utilized to collect, structure, store, and/or analyze the big data. In one example, a client computer may be connected to network 102 to send service request data 104 to server 101. In other words, a client computer may send to request for a solution to a technical problem.

Server 101 includes one or more network interface units 120, a processor 110, and a memory 130. Memory 130 stores a database 131 of structured big data and, as such, is referred to herein as structured database 131. Memory 130 also comprises processing logic 136, which includes monitoring logic 132, analysis logic 133, weighting logic 134 and population logic 135. Memory 130 may comprise read only memory (ROM), random access memory (RAM), magnetic disk storage media devices, optical storage media devices, flash memory devices, electrical, optical, or other physical/tangible memory storage devices. Processor 110 is, for example, a microprocessor or microcontroller that executes instructions for processing logic 136. Thus, in general, memory 130 may comprise one or more tangible (non-transitory) computer readable storage media (e.g., a memory device) encoded with software comprising computer executable instructions and when the software is executed (by the processor 110) it is operable to perform the operations described herein in connection with monitoring logic 132, analysis logic 133, weighting logic 134 and population logic 135. In other words, as described further below, execution of processing logic 136 enables server 101 to implement various features/aspects of the big data management techniques presented herein.

As described further below, the database 131 is configured to store data in a problem-solution format. The database may be analyzed to identify solutions to problems, recommendations for computing devices, etc. As a result of an analysis, a solution to a technical problem or a recommendation is identified. The solution/recommendation may be populated/sent to one or more computing devices (e.g., using network interface units 120) or an indication of the solution/recommendation may be displayed at an attached or remote display screen 137.

Figure 2:
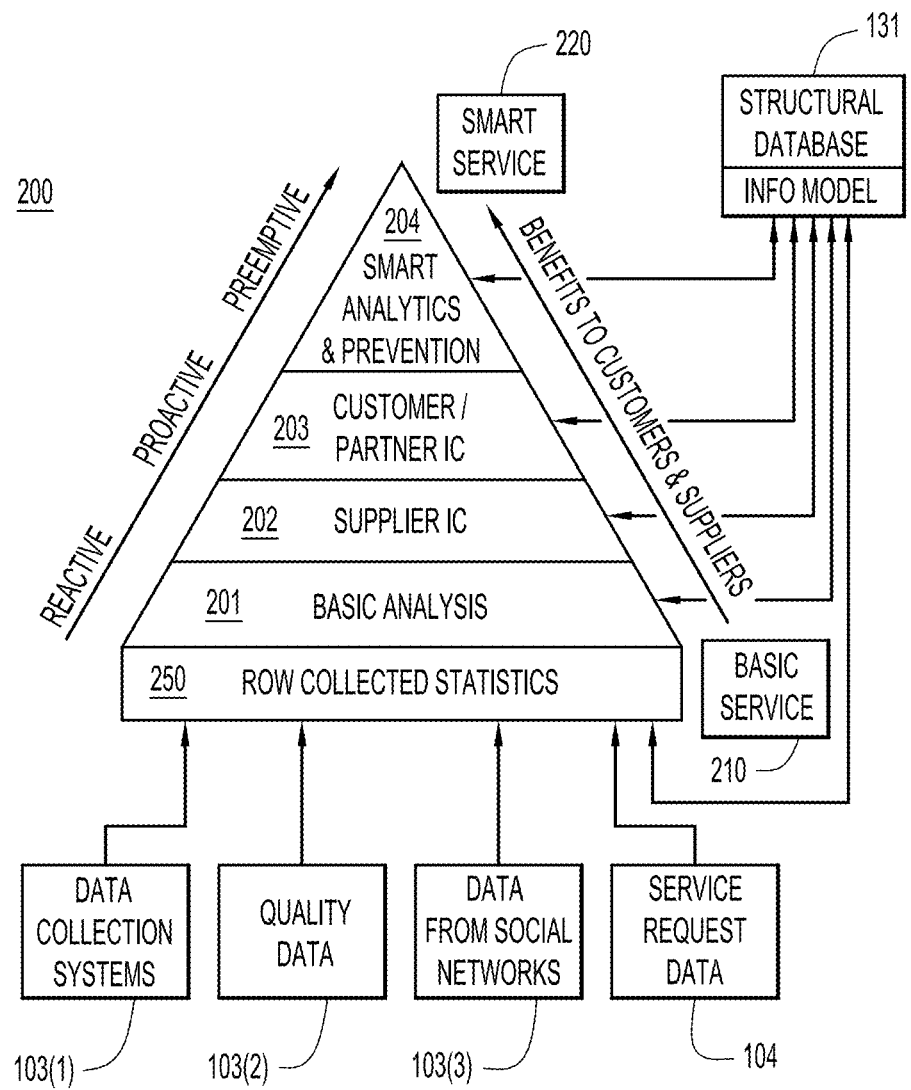
FIG. 2 is a diagram of a services system according to an example embodiment.

FIG. 2 is a diagram providing a general overview of a services system 200 that leverages the big data management system 100 of FIG. 1. The services system 200 may form part of the big data management system 100 of FIG. 1 (i.e., performing analysis operations) or may be a separate entity that leverages the structured database 131. In accordance with the example of FIG. 2, a basic service 210 that may become a smart service 220 by adding smart analytics 204 to row collected statistics 250 that undergo a basic analysis 201 and by delivering the results in a meaningful and actionable way that provides critical value for customers or other users. Services system 200 provides reactive, proactive, preemptive (predictive) services that are automated and intelligence-based to address the operations, health, performance, and security of networks and/or computer devices.

In general, services securely automate the collection of device, network and operations information from the network. Such information may be collected from data collection systems 103(1), quality data sources 103(2) and social network data sources 103(3). The collected information is analyzed and correlated with the vendor's vast repository of proprietary Intellectual Capital (IC) such as Supplier IC 202 and Customer/Partner IC 203, generating actionable intelligence. This intelligence may be used to aid network planners/administrators increase information technology (IT) value, simplify IT infrastructure, reduce cost, and streamline processes.

In certain examples, the big data management techniques presented herein may utilize the Internet Protocol (IP) to collect essential information and communicate with multiple systems. The techniques may identify every managed entity with an IP address (network discovery), data collection and event correlation, based on vendor best practices and intellectual capital utilizing the Internet. Such information may be used to proactively predict the network and service performance that provides information about future trends and threats to enable proactive remediation, so that network planner/administrators can take action before a problem occurs—and preemptive capabilities—those that take action based on intelligence about potential adverse events, to prevent risk-inducing conditions from occurring at all.

An input for smart services is a standardized embedded measurement to be collected from the network devices. This includes, for example, the standardized NETCONF/YANG defined by Internet Engineering Task Force (IETF), Simple Network Management Protocol (SNMP) Management Information Bases (MIBs) that are also defined by the IETF standards for essential FACPS (Fault, Accounting, Configuration, Performance, and Security) management. When NETCONF/YANG+SNMP data are not sufficient, "syslog" and Command Line Interface (CLI) commands are also utilized. In fact, many network devices are configured to send syslog messages to an event collector, such as a syslog server, in response to specific events. The syslog protocol separates the content of a message from the transport of the message. In other words, the device sending the syslog message does not require any communication from the devices transporting or logging the message. This enables devices, which would otherwise be unable to communicate, to notify network administrators of problems.

The collected statistics may then be consumed by various algorithms, utilizing the Intellectual Capital (IC) information to calculate FACPS parameters (e.g., end-to-end network utilization, packet drops per service) and contract renewal related measures. The proposed information data model as well as the system and apparatus to collect and structure big data from multiple sources are steps needed for such algorithms and used after the data is collected.

As described elsewhere herein, not all data is equal. Certain data (e.g., Technical Assistance Center (TAC) data or Customer Assurance Program (CAP) data) about a specific customer or contract identifier (ID) may have a higher weight than a social media message mentioning that customer. In other words, the techniques presented herein may leverage "reputation" associated with each piece of data. Some of the data sources (e.g., a Social Knowledge Platform) already include reputation that is tied to two things (1) reputation of the author, and (2) number of TAC cases that this data solved. However, other data does not have reputation. Consequently, the techniques presented herein include methods to weight the reputation of other data. This may include, for example, performing standard deviation (std-dev) over the distribution of the data within the dataset. This weight is an indication of the "quality" of the data. Some data is raw (e.g., syslogs or TAC case notes), other data has been distilled, filtered, and prioritized already and is higher quality (e.g., a Social Knowledge Platform), and some other data was purposely created, contains pre-built metadata, and is of high quality (e.g., Field Notices or Security Advisories).

Metadata (data about the data) is used to weight the relative value of a piece of data being correlated. Reputation is one example of metadata, but the techniques presented herein support arbitrary metadata including "tags", as well as "coloring". This metadata is transitive to the structure of most anticipated customer use cases. Additionally, some data, by its own nature, cannot be correlated to the particular use cases. For example, anonymous (i.e., non-identifiable) data cannot be used with a customer, other than to baseline a weight.

Figure 3:
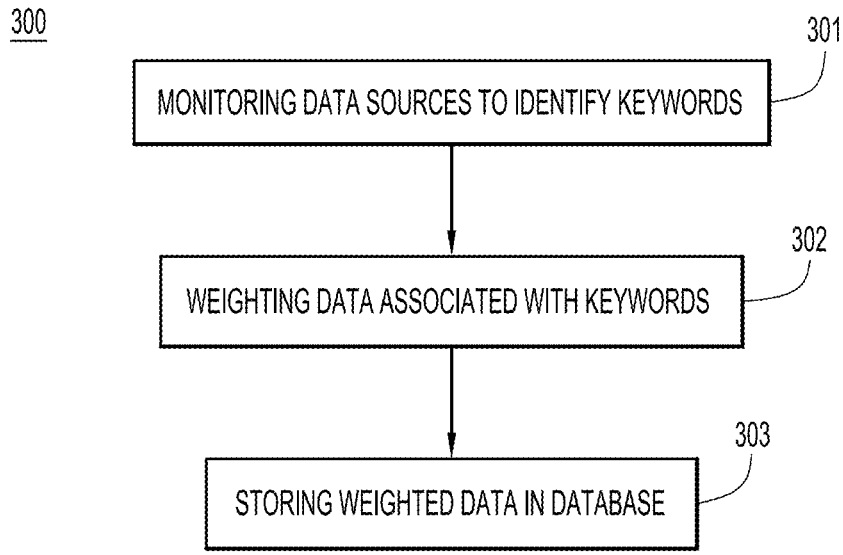
FIG. 3 is a flow chart depicting operations performed by the big data management system according to an example embodiment.

Reference is now made to FIG. 3 (with continued reference to FIG. 1) which illustrates a method 300 of operations performed by the big data management system 100 of FIG. 1. Method 300 begins at 301, where a plurality of data sources, such as data collection system 103(1), quality data source 103(2) and social network data source 103(3), is monitored/analyzed by processor monitoring logic 132 executed by processor 110 to dynamically identify a plurality of keywords.

It is to be appreciated that 301 of method 300 may represent an iterative process that monitors/analyzes a plurality of different sources, portions of sources, etc. For example, in one arrangement a first TAC Case may be analyzed to parse through case notes, in particular the "Titles" and "Topics." One or more keywords may be determined from the Titles and Topics (e.g., part # MEM2811-256D, software version 2811/12.4(15)SW3, and problem descriptions like "Failure to boot the box post power fluctuation" and "fails with a Bad RAM message on the console"). Common words such as "and", "or", etc. may be removed and the remaining words are identified as dynamic keywords. In certain examples, each instances of a keyword may increment a count. This process may then repeat until all or a selected subset of sources or source segments have been analyzed.

Returning to the specific example of FIG. 3, at 302, data associated with the keywords is weighted based on one or more attributes of the data. In one example, static (pre-defined) keywords have an assigned value that is configurable (e.g., a value of 5). Dynamic keywords may have a value equal to the number of occurrences of the keyword in certain contexts (e.g., value is equal to the number of occurrences of the keyword in TAC data). Dynamic keywords may also have increasing weights depending on the context in which the keywords appear (i.e., a value equal to the number of occurrences multiplied by three for Field Notices, since Field Notices are deemed higher quality).

Again returning to the specific example of FIG. 3, at 303, the weighted data is stored in database 131 of FIG. 1. The operations shown in FIG. 3 are described in greater detail below.

Figure 4:
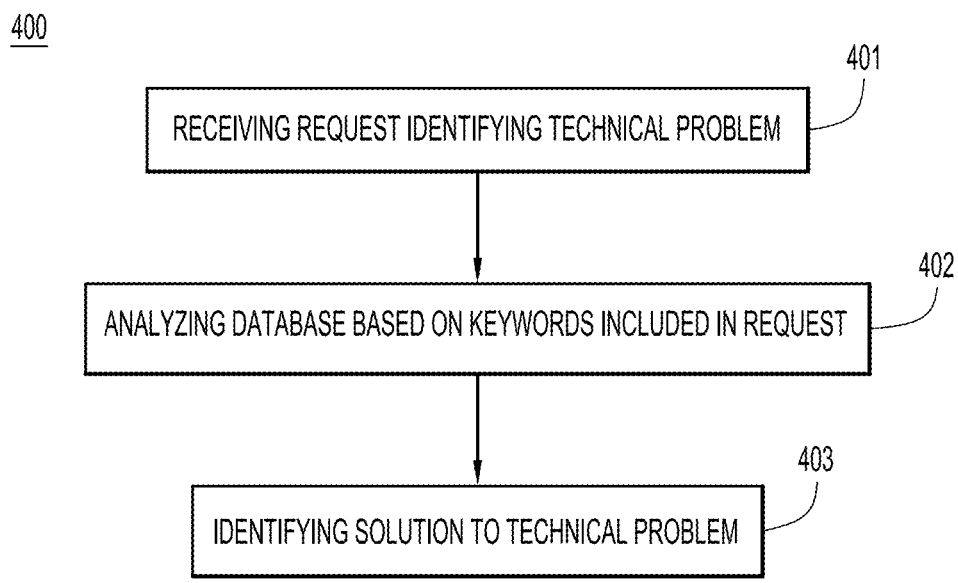
FIG. 4 is a flow chart depicting reactive operations performed by the big data management system according to an example embodiment.

Reference is now made to FIG. 4 which illustrates a method 400 for reactive analysis using the structured database 131 of FIG. 1. That is, FIG. 4 generally illustrates database analysis operations performed in a reactive manner. Method 400 begins at 401 where a request that identifies a technical problem is received by the analysis entity (e.g., big data management system 100 including services system 200). The request may include one or more keywords that identify the technical problem. At 402, database 131 is analyzed based on the keywords included in the received request. At 403, big data management system 100 identifies a solution to the technical problem and is configured to send the solution to the technical problem to one or more computing devices (e.g., computing devices) associated with technical problem, displaying an indication of the solution to the technical problem at an attached or remote display screen, etc.

Figure 5:
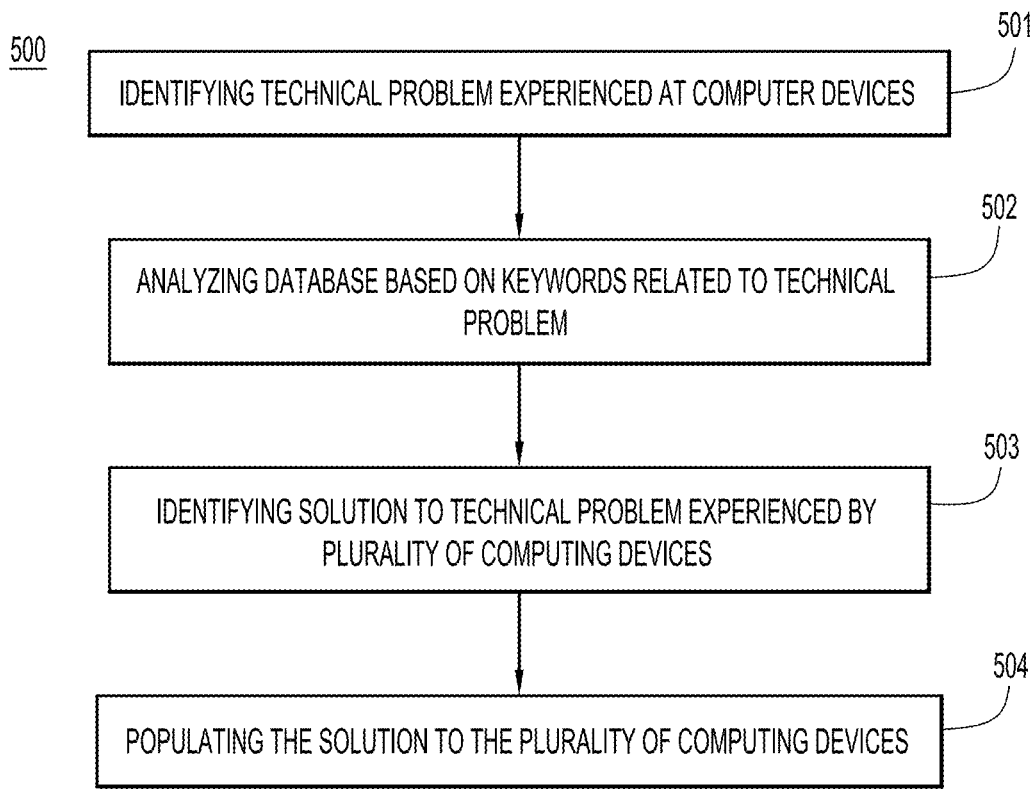
FIG. 5 is a flow chart depicting proactive operations performed by the big data management system according to an example embodiment.

Reference is now made to FIG. 5 which illustrates a method 500 for proactive analysis using the structured database 131 of FIG. 1. That is, FIG. 5 generally illustrates database analysis operations performed in a proactive manner. Method 500 begins at 501 where a technical problem experienced at a plurality of computing devices. The technical problem is identified based on the analysis of keywords stored within the structured database 131. At 502, structured database 131 is analyzed based on the keywords to identify a solution to the technical problem experienced at the plurality of computing devices. As a result of the analyses at 502, a solution to the technical problem is identified, and at 503, the solution to the technical problem is populated/sent to the plurality of computing devices or an indication of the solution to the technical problem at an attached or remote display screen, etc.

Figure 6:
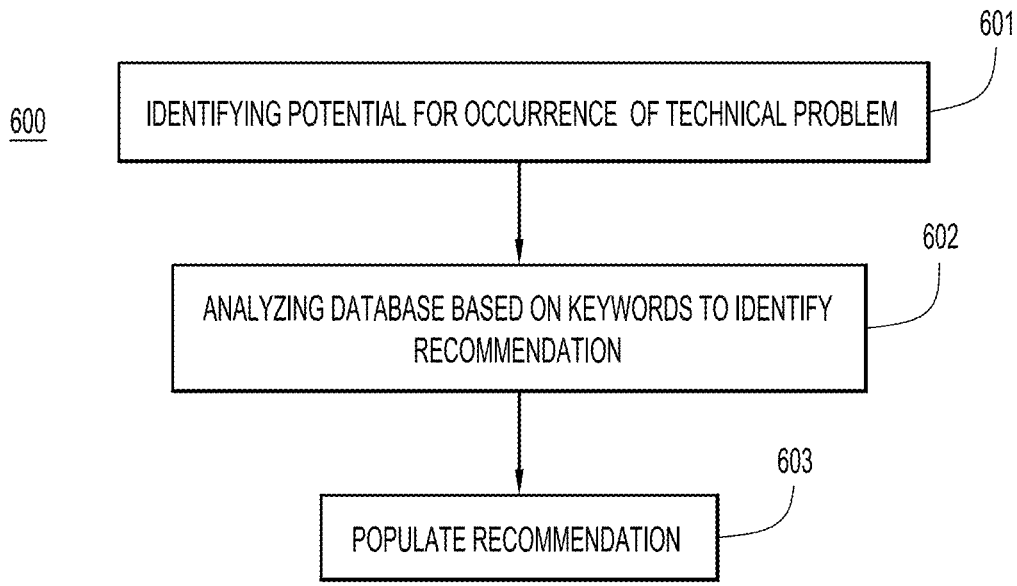
FIG. 6 is a flow chart depicting preemptive operations performed by the big data management system according to an example embodiment.

Reference is now made to FIG. 6 which illustrates a method 600 for preemptive analysis using the structured database 131 of FIG. 1. That is, FIG. 6 generally illustrates database analysis operations performed in a preemptive manner. Method 600 begins at 601 where the occurrence of a potential technical problem at one or more computing devices is identified by big data management system 100 (e.g., through monitoring of data from one or more sources). At 602, database 131 is analyzed based on the one or more keywords to identify a recommendation to prevent the occurrence of the technical problem. At 603, the recommendation is populated to the one or more computed devices that could potentially be affected by the occurrence of the potential technical problem.

Figure 7:
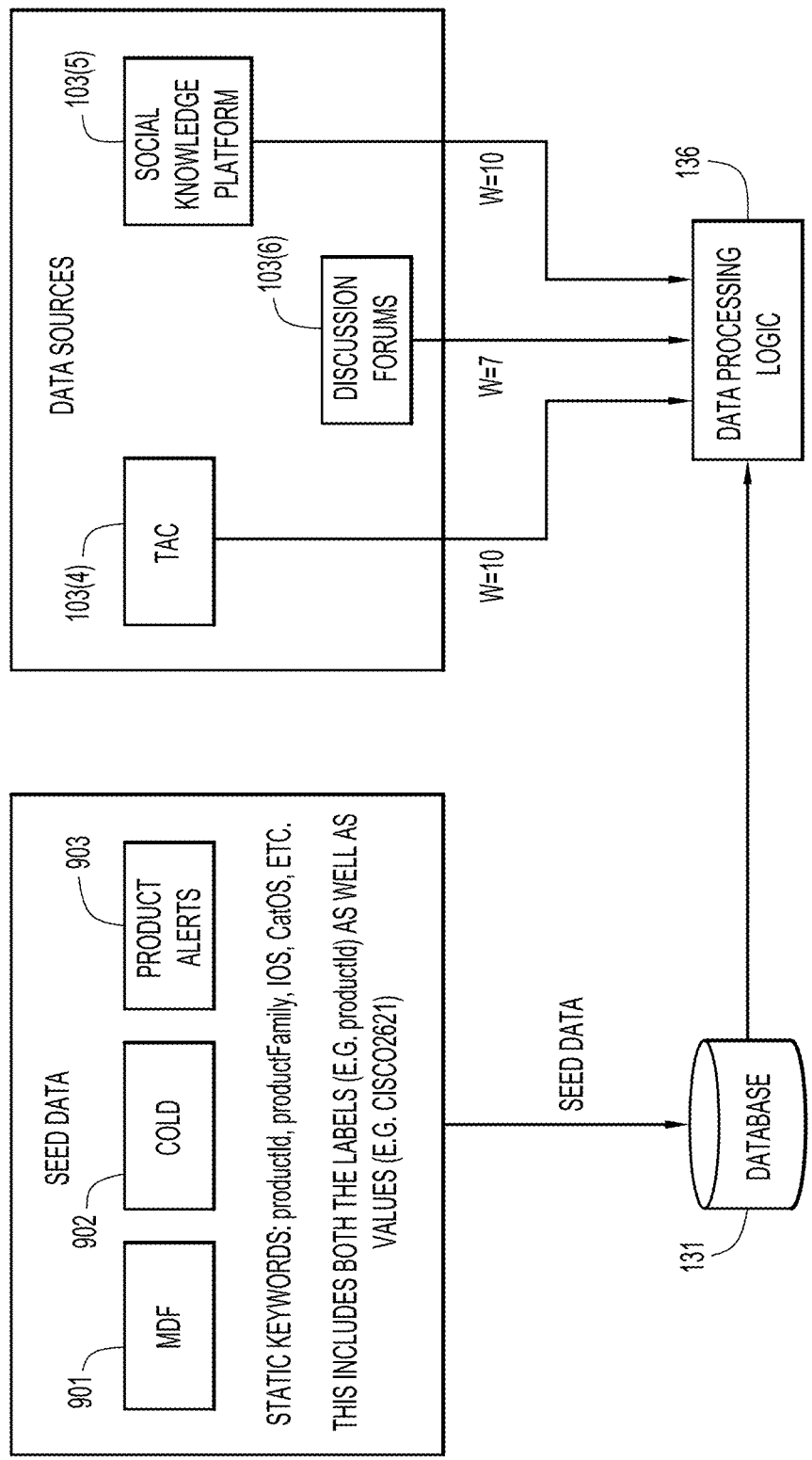
FIG. 7 is a block diagram illustrating how data is stored in a database according to an example embodiment.

FIG. 7 is a block diagram illustrating how big data is stored and structured in structured database 131 according to an example embodiment. As described above, big data management system 100 monitors data from a plurality of big data sources to dynamically identify keywords that are stored in database 131. In addition to the big data sources depicted in FIG. 1, in the example embodiment shown in FIG. 7, the big data sources include a technical assistance center (TAC) 103(4), a data specific discussion board, such as Social Knowledge Platform 103(5), and a general discussion forum 103(6). The data from these big data sources is analyzed to dynamically identify keywords and classify each of the keywords as related either to a technical problem or as related to a solution to the technical problem. The keywords may be weighted based on one or more attributes of the associated data and then the weighted keywords and associated data may be stored in structured database 131. As noted above with reference to FIG. 1, data processing logic 136, which includes monitoring logic 132, analysis logic 133, weighting logic 134 and population logic 135, may be executed to perform the above operations.

In the example embodiment depicted in FIG. 7, the data from TAC 103(4), Social Knowledge Platform 103(5), and discussion forum 103(6) is parsed through execution of monitoring logic 132 of data processing logic 136. For example, monitoring logic 132 may parse through case notes, titles and topics of data records obtained from TAC 103(4), Social Knowledge Platform 103(5), and discussion forum 103(6). The case notes, titles and topics may be identified as key phrases. Common words such as "and," "or," etc. may be removed from the key phrases. Nouns, verbs, or other notable elements that remain after the common words are removed may be identified as candidates for dynamic keywords.

Figure 8:
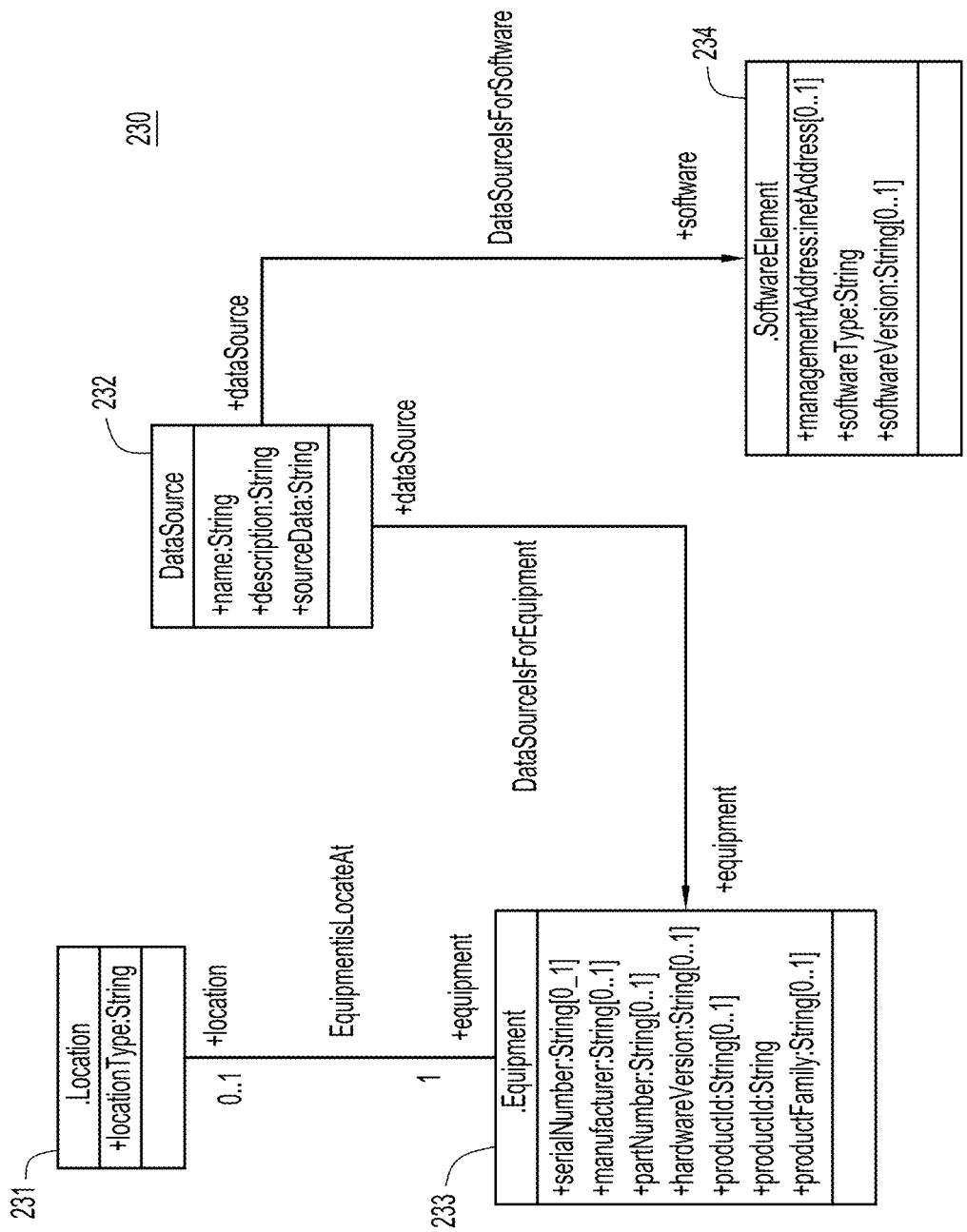
FIG. 8 illustrates a data information model according to an example embodiment.

Database 131 is structured according to a data information model, such as data information model 230 depicted in FIG. 8. As further described in greater detail with regard to FIG. 8, data information model 230 may be initially generated based on predefined static keywords, sometimes referred to herein as "seed data" (e.g., device names or identifiers, product alerts, product families, etc.). In addition, static keywords may include labels such as "productID" and values such as "manufacturer 1234."

As noted above, the techniques presented herein monitor data sources to dynamically identify keywords. When one or more candidates for a dynamic keyword, sometimes referred to herein as candidate dynamic keywords, are identified, a cross-check is performed through execution of processing logic 136 with keywords already included in the data information model to determine, for example: (1) which of the candidate dynamic keywords relates to a technical issue; (2) which of the candidate dynamic keywords relates to a solution to the technical issue; and/or (3) which of the candidate dynamic keywords identifies a network and/or computing device that experienced the technical issue. When the cross-check has successfully been performed, and it is determined that a candidate dynamic keyword is not already included in the data information model, the newly found dynamic keywords are added to the data information model and the structure of database 131 is updated.

Before the data associated with a keyword is stored in database 131, a weight is assigned to the data for each keyword. The weights are assigned based on or more attributes of the underlying data. Attributes of the underlying data may include, for example, a quality or reputation of the data. The quality or reputation of the data may be determined based on, for example, the source of the data, the type of data, etc. For example, data associated with a technical assistant center may be determined to have a higher reputation (and thus a higher assigned weight) than, for example, data associated with a public forum. In one specific example, weights may be based on a reputation of an individual related to the data stored with the keyword. The weight may also be calculated based on a number of occurrences of a keyword in a plurality of data sources. It is to be appreciated that other criteria may also be used for assigning a weight to the data associated with a keyword.

The weight is assigned to the data through execution of weighting logic 134 of data processing logic 136. In the example embodiment depicted in FIG. 7, weights are assigned based on the origin of the data associated with the keywords. Data from TAC 103(4) and Social Knowledge Platform 103(5) has a weight equal to 10. Data from Discussion forums 103(6) has a weight equal to 7.

Referring now to FIG. 8, a data information model 230 that defines basic entities and relationships needed to capture the information according to an example embodiment. Data information model 230 includes product identification information, such as location 231, data source 232, equipment 233 and software element 234 that can be used as search parameters for analyzing database 131.

Location 231 may include physical location information related to a particular hardware product, such as, for example, a network device, a computing device, etc. Data source 232 includes information identifying a source for collected data as well as a source of original data of interest, which may be subject to finer analysis following initial classification. Equipment 233 includes a generic representation of hardware products identified by a product identifier (product ID). Software element 234 contains information about an operating system or a software application.

Figure 9:
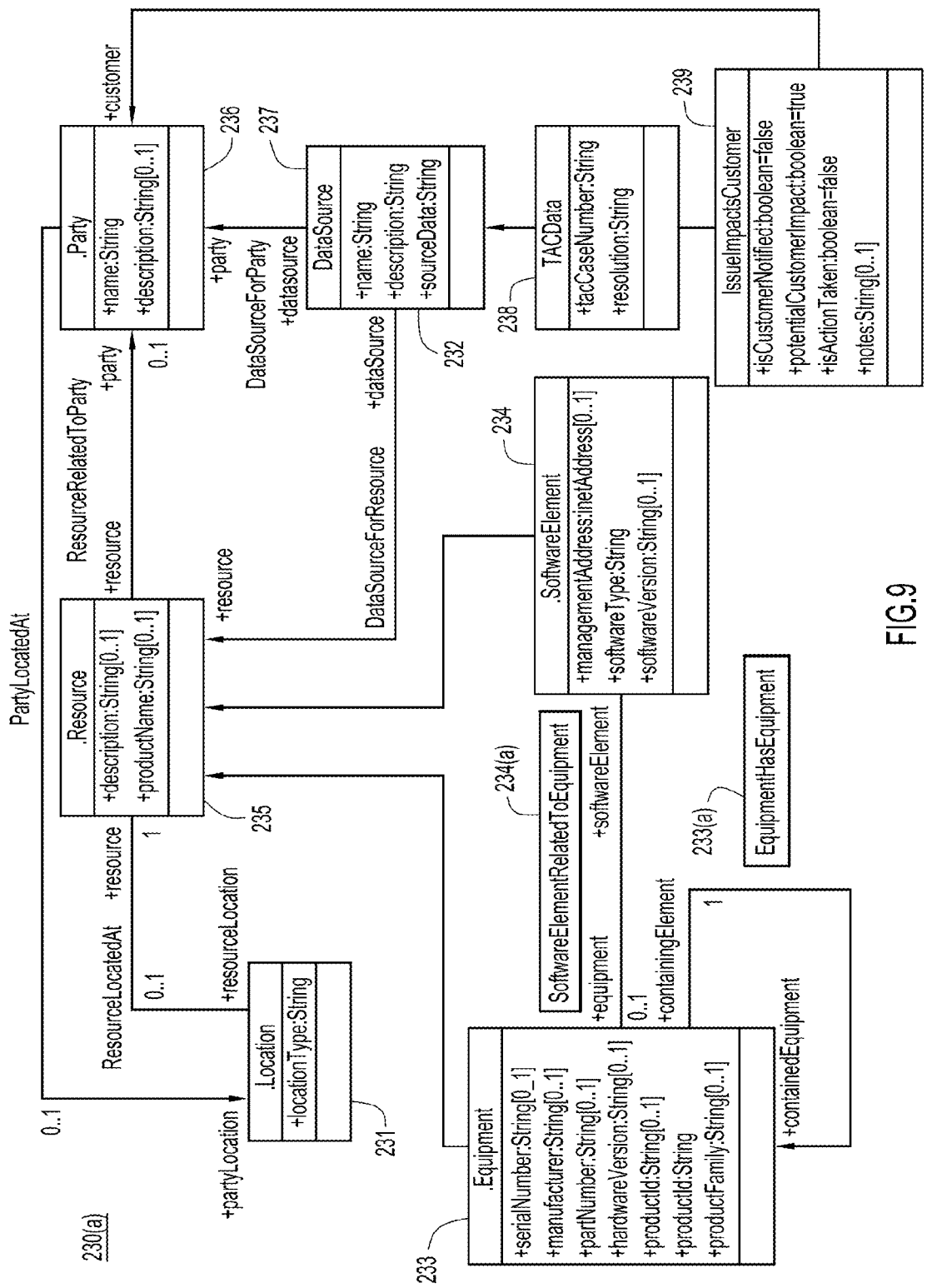
FIG. 9 illustrates an enhanced data information model according to an example embodiment.

As content may vary across the target data sources, data information model 230 may need to be expanded to accommodate those variations. FIG. 9 illustrates enhanced data information model 230(a) according to a further example embodiment. Enhanced data information model 230(a) includes the several elements in addition to location 231, data source 232, equipment 233 and software element 234 of FIG. 8.

More specifically, in FIG. 9, resource 235 defines an abstract class to host relationships and serves as an extension point. Party 236 defines an organization or an individual. Party 236 may be used to reflect some sort of affinity (such as ownership) to the stored data relating to a product, computing or networking device, etc. Party 236 may also hold information about the party obtained during the collection process, such as contact and location information.

Element "Equipment Has Equipment" 233(a) allows a hierarchical representation of equipment that includes other equipment. Element "Software Element Related To Equipment" 234(a) defines a relationship between software element 234 and equipment 233 and allows correlation of network and/or computing devices (or in general of products) to related operating system or applications. TAC Data 238 defines data from TACs. Data Source 237 defines data from a data source in general, and element "Issue Impacts Customer" 239 defines an impact a technical issue may have for a customer defined as party 236 in enhanced data information model 230(a).

An aspect of TAC Data 238 is the concept of data reputation. In particular, with regard to TAC Data 238, an assurance index for correlation of the data is calculated. To evaluate which piece of data is more relevant, a normalized reputation is calculated based on the following Equation 1:

$$Value = relevance\_index * normalized\ reputation,$$

where the normalized reputation is a reputation index normalized to one (e.g., divided by the max reputation value).

Another aspect of TAC Data 238 relates to its transitive character. Specifically, data related to a particular technical field (e.g., from a Social Knowledge Platform) may include a set of pointers to TAC Service Requests (SR). A problem-solution pair (i.e., a piece of Social Knowledge Platform data) may contain a matrix of pointers to the TAC SRs that solved the particular problem-solution pair. In addition, the SRs themselves may contain fields, which include product, version, customer, etc. For the purposes of producing a useful result, an SR number is provided. However, the SR number is an opaque pointer representing an intermediate step in a transitive operation to identify the problem-solution pair (with its own reputation) applicable to a product, version, customer network, etc.

Figure 10:
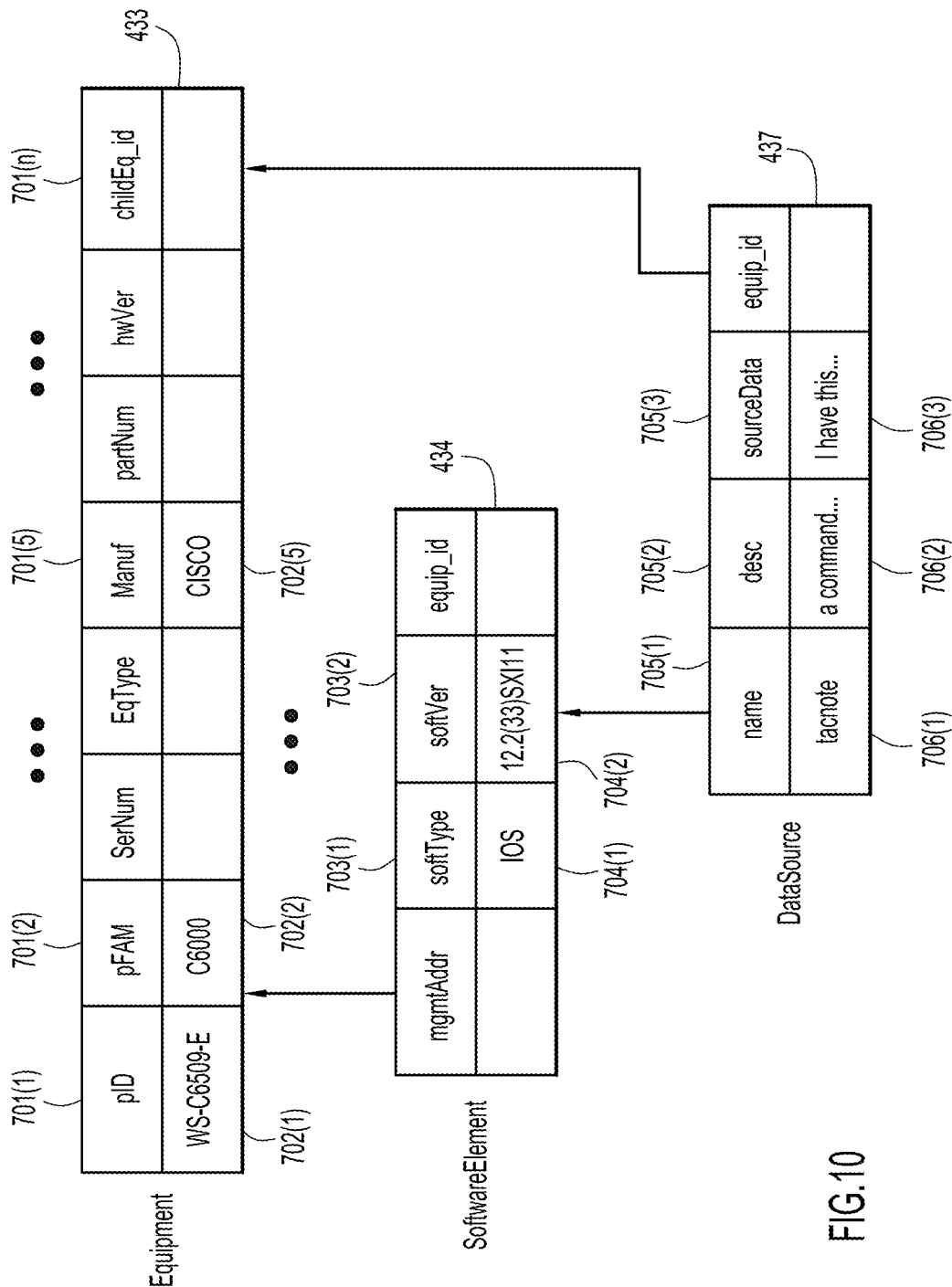
FIG. 10 is a block diagram illustrating tables of a database generated based on a data information model according to an example embodiment.

Reference is now made to FIG. 10 which is a block diagram illustrating tables of a database generated based on data information model 230 depicted in FIG. 8 according to an example embodiment.

As discussed with regard to FIG. 8, equipment 233 of data information model 230 contains a generic representation of hardware products identified by a product identifier. FIG. 10 shows equipment record 433 of equipment 233 which contains product identifier (pID) 701(1), product family (pFam) 701(2) and manufacturer (Manuf) 701(5). Elements 701(1) to 701(n) generally describe categories and elements 702(1), 702(2) and 702(5) are examples of static or seed keywords discussed with regard to FIG. 7.

Similar to equipment record 433 for equipment 233 of data information model 230, FIG. 10 further depicts software element record 434 for software element 234, and data source record 437 for data source 237 of data information model 230. Software element record 434 contains categories 703(1) and 703(2) representing software type and software version and keywords 704(1) and 704(2) stored under categories 703(1) and 703(2).

As shown in FIG. 10, data source record 437 for data source 237 of data information model 230 contains categories 705(1), 705(2) and 705(3) under which keyword 706(1) and data 706(2) and 706(3) associated with keyword 706(1) is stored. More specifically, data source record 437 contains data 706(2) and 706(3) associated with the keyword 706(1) "tacnote". For example, data 706(2) may contain the following entry: "Command A is taking too long to appear on supervisors, using vss . . . ". Data 706(3) may have the following content: "I have this particular situation with a 6500 running VSS and 12.2(33)SXI11."

Data 706(2) may be identified by processing logic 136 as corresponding to a technical problem. In addition, Data 706(3) may be analyzed by data processing logic 136 to identify keywords such as keyword 704(2) representing a software version (12.2(33)SXI11) that is contained in data 706(3). As a result, data 706(2) and 702(3) may be associated with keyword 704(2). Similarly, processing logic 136 may identify keyword 702(2) as being related to data 706(2) and 706(3).

Reference is now made FIG. 11 which illustrates a simplified view of records of keywords in database 131 according to an example embodiment. More specifically, column 801 includes keywords ("Reboot", "Memory Error", "Unreachable", and "Reload") describing a technical issue. Column 802 describes whether the keyword is a dynamic or a static keyword. In other words, column 802 describes whether the keyword is a predefined seed/static keyword or whether the keyword was dynamically identified by monitoring a plurality of big data sources, such as TAC source 103(4), Social Knowledge Platform source 103(5) and general discussion forum 103(6) discussed with regard to FIG. 7. In the diagram of FIG. 11, keywords "Reboot" and "Reload" defining a technical issue (Problem) are predefined static keywords and keywords "Memory Error" and "Unreachable" are dynamic keywords.

Columns 804 and 807 include keywords describing a product and a software, respectively, and columns 805 and 808 describe the type of keyword (i.e., whether it is static or dynamic). Columns 803, 806 and 809 of the simplified view of records of structured database 131 include values for a weight assigned to data associated with the respective keyword. As discussed with regard to FIG. 7, a weight can be assigned to data associated with a keyword in many ways. While a reputation of an individual related to the data stored with the keyword may be a factor in determining the weight, a number of occurrences of a keyword in a plurality of data sources may also be used to calculate a value of the weight.

In addition, it is possible to assign a predefined value to data associated with a static keyword. In the diagram of FIG. 11, data associated with static keywords "Reload" and "12.4(15)SW3 has a weight value of 5, for example, because the corresponding keywords are static keywords. Data associated with dynamic keywords, such as "Unreachable" and "76xx" may have a weight value equal to a number of occurrences. In the example embodiment of FIG. 11, seven (7) cases in which a computing device was "unreachable" may have occurred and reported in TAC source 103(4), or in TAC source 103(4), Social Knowledge Platform source 103(5) and general discussion forum 103(6) together. As a result, data resulting from these reported cases and associated with the keyword "Unreachable" have a weight value of 7.

When data from a particular big data source, or data associated with an individual that has a reputation higher than the reputation of other individuals, is associated with a dynamic keyword, the number of occurrences of a certain case may be multiplied by a predefined factor to increase the weight of the respective data. For example, a "memory error" may have occurred 4 times and may have been reported via TAC source 103(4) as a field notice. In this case, the data associated with the keyword "memory error" in row 811 is deemed to have a higher quality than other data in category "Problem" in column 801 relating to technical issues. Therefore, a predefined factor (in this case factor 3) is used to calculate the weight value 12 for dynamic keyword "Memory Error," based on 4 occurrences multiplied by factor 3, as shown in row 811 of FIG. 11. Of course, the factor is not limited to 3 and may be predetermined depending on quality or any other criteria for weighting the data associated with the keywords.

Dynamic keywords may carry a count equal to the number of times they appear or occur in all the cases. On the other hand, problem descriptions are often weighted by a factor, as discussed above, and therefore problem descriptions are expected to have a higher weight value than software versions, which have more dispersion, as shown in column 807 of FIG. 11.

In addition to grouping keywords by categories such as by "Problem" in column 801, by "Product" in column 804 and by "Software" in column 807, keywords may also be grouped by rows, like rows 810-813. Based on the grouping by rows, a probability can be calculated that is equal to a multiplication of the corresponding weight values divided by the number of weight values. The result of this calculation indicates a probability to find a solution to the technical problem.

For example, a new customer interaction may involve product "NX9k", matching software "12.4(15)SW3" and a "Reboot" problem. The keywords are grouped in row 810 and a probability is calculated based on weights 15, 14 and 5 which results in a probability to find a solution of 10.5%.

Figure 12:
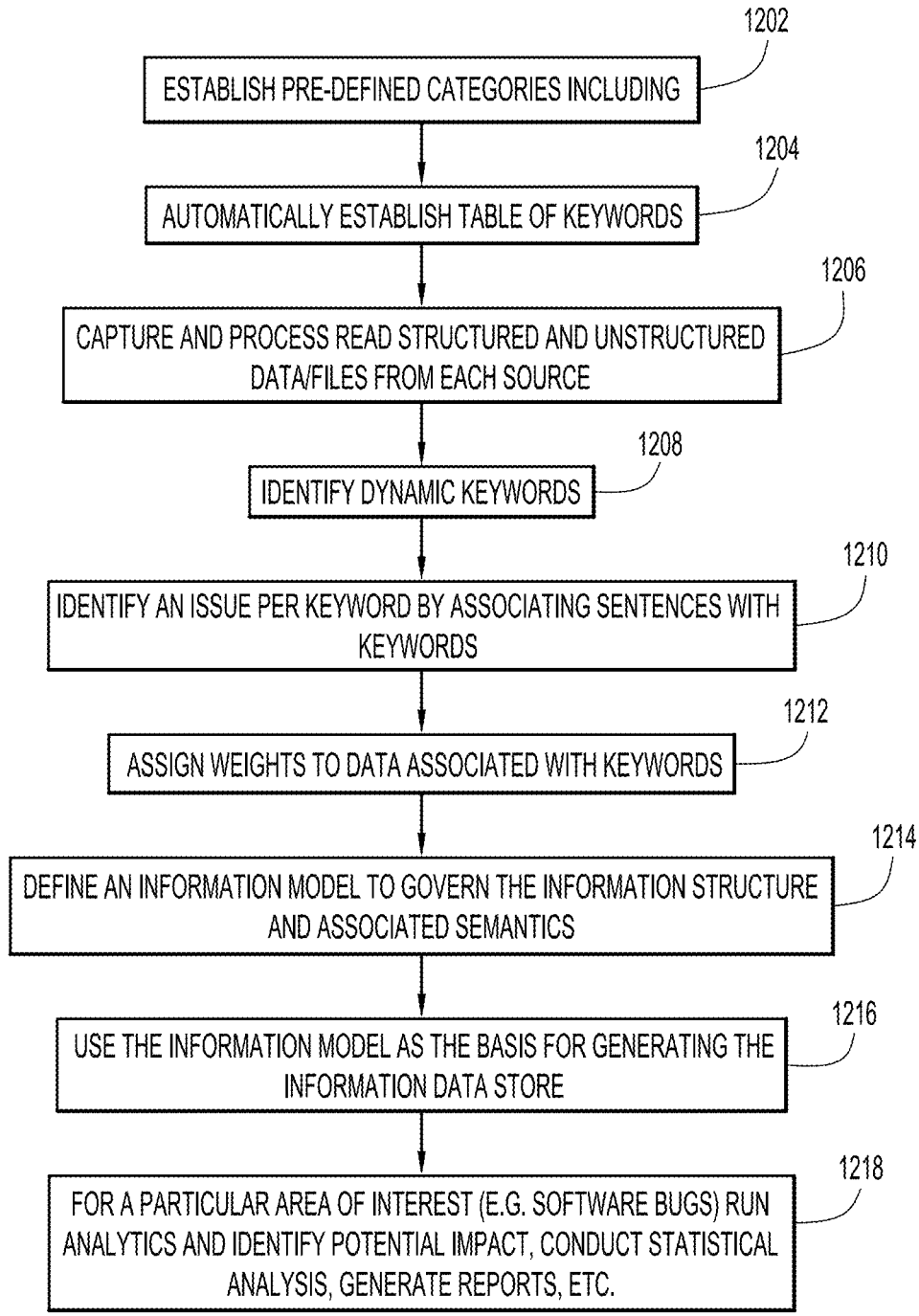
FIG. 12 is a flowchart in accordance with examples presented herein.

FIG. 12 is a flowchart of a method 1200 providing an illustrative summary or overview of operations performed in accordance the techniques presented herein. Method 1200 begins at 1202 where pre-defined categories including, but not limited to, Product Lines (e.g., router, switches, devices), applications, etc. are established. Categories may be automatically determined (i.e., learned) from anonymized data. At 1204, a table of keywords may be automatically established. The table of keywords may include static (predefined) keywords or dynamically determined keywords. The keywords/categories enable searching and summarizing/categorizing all captured problems.

At 1206, structured and unstructured data/files from each source are collected/captured and processed/read. At 1208, dynamic keywords are identified and may include, for example, nouns from titles/headers (titles often refer to the keyword/issue to be tracked, most frequent nouns (analyzed data from social networks indicated key issues are repeated most frequently), or specific phrases (e.g., Failure, Solution). At 1210, an issue is identified per keyword by associating sentences with keywords. At 1212, weights may be assigned to data associated with keywords At 1214, an information model to govern the information structure and associated semantics is defined and, at 1216, the information model is used as the basis for generating the information data store (structured database). In the case of a relational database, keywords may be designated as column headers. At 1218, analytics may be run for a particular area of interest (e.g. software bugs) to identify potential impact, conduct statistical analysis, generate reports, etc.

In summary, a method is provided in which a monitoring logic executed by a processor monitors a plurality of data sources to dynamically identify a plurality of keywords. An analyzing logic executed by the processor analyzes the data sources to classify each of the keywords as related to either a technical problem or as related to a solution to a technical problem and a weighting logic executed by the processor weights data associated with the keywords based on one or more attributes of the data. The weighted data associated with the keywords is stored in a database in a problem-solution format. The monitoring logic also monitors the plurality of data sources to identify one or more predefined static keywords.

Dynamic keywords are identified by parsing the data collected from the plurality of data sources, identifying a key phrase in the data collected from the plurality of data sources and removing at least one common phrase from the key phrase thereby generating the dynamic keyword.

Data associated with the keywords is weighted. To weight the data associated with the keywords based on one or more attributes, an individual related to data stored with a first keyword is identified, a reputation of the individual is determined and a first weight is assigned to the data associated with the first keyword based on the reputation of the individual related to the data associated with the first keyword.

The weight may also be assigned to the data associated with a keyword by calculating a number of occurrences of a second keyword in data of one of the plurality of data sources. When the number of occurrences is calculated, a second weight is assigned to the data associated with the second keyword that is equal to the number of occurrences and the second weight is multiplied with a factor that represents a relevance of the data associated with the second keyword with regard to the technical problem and with regard to the solution to the technical problem.

When the weighted data associated with the keywords in the problem-solution formed is stored in the database, keywords related to a first computing device, keywords related to a first technical problem, and keywords related to a first solution are identified. The keywords related to the first product, the first technical problem and the first solution are combined to a first keyword group.

When a request is received including keywords identifying the technical problem, the database is analyzed based on the keywords included in the request and the technical problem and the solution to the technical problem are identified in a reactive manner.

It is also possible to identify a technical problem experienced at a plurality of computing devices associated with at least one of the plurality of data sources in a proactive manner based on one or more keywords. The database may be analyzed based on the one or more keywords to identify a solution to the technical problem experienced at the plurality of computing devices. The solution to the technical problem may be populated in a proactive manner to the plurality of computing devices associated with the at least one of the plurality of data sources and/or an indication of the solution to the technical problem at an attached or remote display screen, etc.

In addition, a potential for an occurrence of a technical problem at one or more computing devices associated with at least one of the plurality of data sources may be identified based on one or more keywords by analyzing the database based on the one or more keywords. Based on the analysis, a recommendation to prevent the occurrence of the technical problem may be determined and populated to the one or more computing devices.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer-implemented method comprising:
   monitoring a plurality of big data sources to dynamically identify keywords;
   analyzing the plurality of big data sources to classify each of the keywords either as related to a technical problem, or as related to a solution to the technical problem;
   weighting data collected from the plurality of big data sources and associated with the keywords based on a quality of the data, wherein the quality of the data is based on one or more reputations associated with the plurality of big data sources, wherein weighting the data includes:
      calculating a number of occurrences of one of the keywords in a set of the data collected from one of the big data sources of the plurality of big data sources;
      assigning, to the set of the data, a weight that is equal to the number of occurrences; and
      multiplying the weight with a factor that represents the quality of the set of the data; and
   storing the weighted data associated with the keywords in a database in a problem-solution format.

2. The computer-implemented method of claim 1, wherein monitoring the plurality of big data sources includes:
   monitoring the plurality of big data sources to identify one or more predefined static keywords.

3. The computer-implemented method of claim 1, wherein monitoring the plurality of big data sources includes:
   parsing the data;
   identifying a key phrase in the data; and
   removing at least one common phrase from the key phrase to generate a dynamic keyword.

4. The computer-implemented method of claim 1, wherein storing the weighted data includes:
   identifying a first set of the keywords related to a computing device; identifying a second set of the keywords related to the technical problem, wherein the technical problem is experienced at the computing device;
   identifying a third set of the keywords related to the solution; and
   combining the first set of the keywords, the second set of the keywords, and the third set of the keywords to produce a keyword group.

5. The computer-implemented method of claim 1, further comprising:
- receiving a request including a set of the keywords identifying the technical problem; analyzing the database based on the set of the keywords;
- identifying the solution to the technical problem; and at least one of sending the solution to the technical problem to one or more computing devices, and
- displaying an indication of the solution to the technical problem at a display screen.

6. The computer-implemented method of claim 1, further comprising:
- identifying, based on one or more of the keywords, the technical problem, wherein the technical problem is experienced at a plurality of computing devices associated with at least one big data source of the plurality of big data sources;
- analyzing the database based on the one or more of the keywords to identify the solution to the technical problem; and at least one of sending the solution to the technical problem to the plurality of computing devices associated with the at least one big data source of the plurality of big data sources, and
- displaying an indication of the solution to the technical problem at a display screen.

7. The computer-implemented method of claim 1, further comprising:
- identifying, based on one or more of the keywords, a potential for an occurrence of the technical problem at one or more computing devices associated with at least one big data source of the plurality of big data sources;
- analyzing the database based on the one or more of the keywords to identify a recommendation to prevent the occurrence of the technical problem; and at least one of sending the recommendation to the one or more computing devices, and displaying an indication of the recommendation at a display screen.

8. One or more non-transitory computer readable storage media encoded with software comprising computer executable instructions that when executed, are operable to:
- monitor a plurality of big data sources to dynamically identify keywords;
- analyze the plurality of big data sources to classify each of the keywords either as related to a technical problem, or as related to a solution to the technical problem;
- weight data collected from the plurality of big data sources and associated with the keywords based on a quality of the data, wherein the quality of the data is based on one or more reputations associated with the plurality of big data sources, wherein the instructions operable to weight the data include instructions operable to:
  - calculate a number of occurrences of one of the keywords in a set of the data collected from one of the big data sources of the plurality of big data sources;
  - assign, to the set of the data, a weight that is equal to the number of occurrences; and
  - multiply the weight with a factor that represents the quality of the set of the data; and
- store the weighted data associated with the keywords in a database in a problem-solution format.

9. The non-transitory computer readable storage media of claim 8, wherein the instructions operable to monitor the plurality of big data sources include instructions operable to:
- monitor the plurality of big data sources to identify one or more predefined static keywords.

10. The non-transitory computer readable storage media of claim 8, wherein the instructions operable to monitor the plurality of big data sources include instructions operable to:
- parse the data; identify a key phrase in the data; and remove at least one common phrase from the key phrase to generate a dynamic keyword.

11. The non-transitory computer readable storage media of claim 8, wherein the instructions operable to store the weighted data include instructions operable to:
- identify a first set of the keywords related to a computing device;
- identify a second set of the keywords related to the technical problem, wherein the technical problem is experienced at the computing device;
- identify a third set of the keywords related to the solution; and combine the first set of the keywords, the second set of the keywords, and the third set of the keywords to produce a keyword group.

12. The non-transitory computer readable storage media of claim 8, further comprising instructions operable to:
- receive a request including a set of the keywords identifying the technical problem;
- analyze the database based on the set of the keywords;
- identify the solution to the technical problem; and at least one of send the solution to the technical problem to one or more computing devices, and display an indication of the solution to the technical problem at a display screen.

13. The non-transitory computer readable storage media of claim 8, further comprising instructions operable to:
- identify, based on one or more of the keywords, the technical problem, wherein the technical problem is experienced at a plurality of computing devices associated with at least one big data source of the plurality of big data sources;
- analyze the database based on the one or more of the keywords to identify the solution to the technical problem; and at least one of send the solution to the technical problem to the plurality of computing devices associated with the at least one big data source of the plurality of data sources, and display an indication of the solution to the technical problem at a display screen.

14. The non-transitory computer readable storage media of claim 8, further comprising instructions operable to:
- identify, based on one or more of the keywords, a potential for an occurrence of the technical problem at one or more computing devices associated with at least one big data source of the plurality of big data sources;
- analyze the database based on the one or more of the keywords to identify a recommendation to prevent the occurrence of the technical problem; and
- at least one of send the recommendation to the one or more computing devices, and display an indication of the recommendation at a display screen.

15. An apparatus comprising:
- one or more network interface units;
- a memory; and
- a processor coupled to the one or more network interface units and the memory, wherein the processor:
  - monitors a plurality of big data sources to dynamically identify keywords;
  - analyzes the plurality of big data sources to classify each of the keywords either as related to a technical problem or as related to a solution to the technical problem;
  - weights data collected from the plurality of big data sources and associated with the keywords based on a quality of the data, wherein the quality of the data is based on one or more reputations associated with the plurality of big data sources, wherein to weight the data, the processor:

calculates a number of occurrences of one of the keywords in a set of the data collected from one of the big data sources of the plurality of big data sources;

assigns, to the set of the data, a weight that is equal to the number of occurrences; and multiplies the weight with a factor that represents the quality of the set of the data; and stores the weighted data associated with the keywords in a database in a problem-solution format.

16. The apparatus of claim 15, wherein to monitor the plurality of big data sources, the processor:

monitors the plurality of big data sources to identify one or more predefined static keywords.

17. The apparatus of claim 15, wherein to monitor the plurality of data sources, the processor:

parses the data;

identifies a key phrase in the data; and removes at least one common phrase from the key phrase to generate a dynamic keyword.

18. The apparatus of claim 15, wherein to store the weighted data, the processor:

identifies a first set of the keywords related to a computing device; identifies a second set of the keywords related to the technical problem, wherein the technical problem is experienced at the computing device;

identifies a third set of the keywords related to the solution; and combines the first set of the keywords, the second set of the keywords, and the third set of the keywords to produce a keyword group.

19. The apparatus of claim 15, wherein the processor:

receives a request including a set of the keywords identifying the technical problem;

analyzes the database based on the set of the keywords;

identifies the solution to the technical problem; and at least one of sends the solution to the technical problem to one or more computing devices, and displays an indication of the solution to the technical problem at a display screen.

20. The apparatus of claim 15, wherein the processor:

identifies, based on one or more of the keywords, the technical problem, wherein the technical problem is experienced at a plurality of computing devices associated with at least one big data source of the plurality of big data sources;

analyzes the database based on the one or more of the keywords to identify the solution to the technical problem; and at least one of sends the solution to the technical problem to the plurality of computing devices associated with the at least one big data source of the plurality of big data sources, and displays an indication of the solution to the technical problem at a display screen.

21. The apparatus of claim 15, wherein the processor:

identifies, based on one or more of the keywords, a potential for an occurrence of the technical problem at one or more computing devices associated with at least one big data source of the plurality of big data sources;

analyzes the database based on the one or more of the keywords to identify a recommendation to prevent the occurrence of the technical problem; and at least one of sends the recommendation to the one or more computing devices, and displays an indication of the recommendation at a display screen.

\* \* \* \* \*